United States Patent
Batta

(10) Patent No.: US 8,391,169 B2
(45) Date of Patent: Mar. 5, 2013

(54) METHODS AND APPARATUS FOR LOCATING A MOBILE DEVICE IN A SLEEP MODE

(75) Inventor: Puneet Batta, Sunnyvale, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1160 days.

(21) Appl. No.: 12/263,003

(22) Filed: Oct. 31, 2008

(65) Prior Publication Data

US 2010/0110948 A1    May 6, 2010

(51) Int. Cl.
  *H04L 12/26* (2006.01)
  *H04L 12/28* (2006.01)
  *H04L 12/56* (2006.01)
  *H04J 3/16* (2006.01)

(52) U.S. Cl. ........ 370/252; 370/254; 370/392; 370/437; 455/404.2; 455/574

(58) Field of Classification Search ........................ None
See application file for complete search history.

(56) References Cited

U.S. PATENT DOCUMENTS

| | | | | |
|---|---|---|---|---|
| 2003/0227893 A1* | 12/2003 | Bajic | .............................. | 370/338 |
| 2005/0014516 A1* | 1/2005 | Rached et al. | .............. | 455/456.1 |
| 2005/0129009 A1* | 6/2005 | Kitchin | .......................... | 370/389 |
| 2005/0232200 A1* | 10/2005 | Jeong et al. | .................... | 370/331 |
| 2006/0088019 A1* | 4/2006 | Liebsch | .......................... | 370/338 |
| 2006/0194594 A1* | 8/2006 | Ruutu et al. | ................ | 455/456.5 |
| 2007/0259700 A1* | 11/2007 | Meier et al. | .................... | 455/574 |
| 2008/0069065 A1* | 3/2008 | Wu et al. | ......................... | 370/340 |
| 2010/0054230 A1* | 3/2010 | Sridhara et al. | ................ | 370/348 |

OTHER PUBLICATIONS

U.S. Appl. No. 61/091,782, Sridhara et al., Multichannel TDMA Mechanism, Aug. 26, 2008, paragraphs [0020]-[0021].*

* cited by examiner

*Primary Examiner* — Chirag Shah
*Assistant Examiner* — Ashley Shivers

(57) ABSTRACT

Apparatus and methods are provided for locating a mobile device in a sleep mode. A method comprises transmitting a beacon signal configured to initiate transmission of a response signal from a mobile device in a sleep mode. The mobile device is associated with a first wireless access device on a first communication channel. The method further comprises receiving the response signal from the mobile device on the first communication channel and determining the physical location of the mobile device based on the response signal.

6 Claims, 3 Drawing Sheets

METHODS AND APPARATUS FOR LOCATING A MOBILE DEVICE IN A SLEEP MODE

TECHNICAL FIELD

Embodiments of the subject matter described herein relate generally to wireless network infrastructures, and more particularly, embodiments of the subject matter relate to methods and apparatus for determining the physical location of a mobile device that is in a sleep mode.

BACKGROUND

In order to conserve power, wireless mobile devices often enter a power save or sleep mode, where components of the mobile device consume little power (e.g., radio components are disabled or placed into a low power state) when there is no pending data for the mobile device to transmit or receive. For example, the 802.11 standard may be utilized to provide a power save feature for mobile devices, wherein a mobile device will periodically wake and listen for a beacon signal before returning to the power save mode. In this manner, the mobile device conserves power and prolongs the life of its battery.

Large wireless networks (such as wireless local area networks or WLANs), often utilize numerous access devices spread throughout an area, such as a warehouse, building or campus. In some situations, it may be desirable to determine the physical location of a mobile device on the wireless network. For example, a user may need to locate a mobile device that has been lost or misplaced. Alternatively, in some cases, a mobile device may be associated with some other object that a user would like to locate. For example, a mobile device may be mounted to a forklift, pallet, or another object that the user is trying to locate.

In some current wireless networks, it is possible to triangulate and determine the location of a mobile device. For example, if at least three access devices receive a frame from the mobile device at the same time, the physical location of the mobile device may be determined based on the physical location of the access devices and the respective signal strength of the frame at each access device. However, this method is difficult to effectively implement in practice because it relies on multiple access devices being able to receive the frame at the same time from the mobile device. For example, in most wireless networks, the access devices use non-overlapping channels, and thus only one access device typically receives the frame from the mobile device. Furthermore, once the mobile device enters into a power save mode or sleep mode, the mobile device no longer transmits frames on a regular basis. As a result, it is difficult to synchronize the access devices for receiving a frame from the mobile device, and as such, the prior art methods are ineffective without complex synchronization schemes and/or programming overhead.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
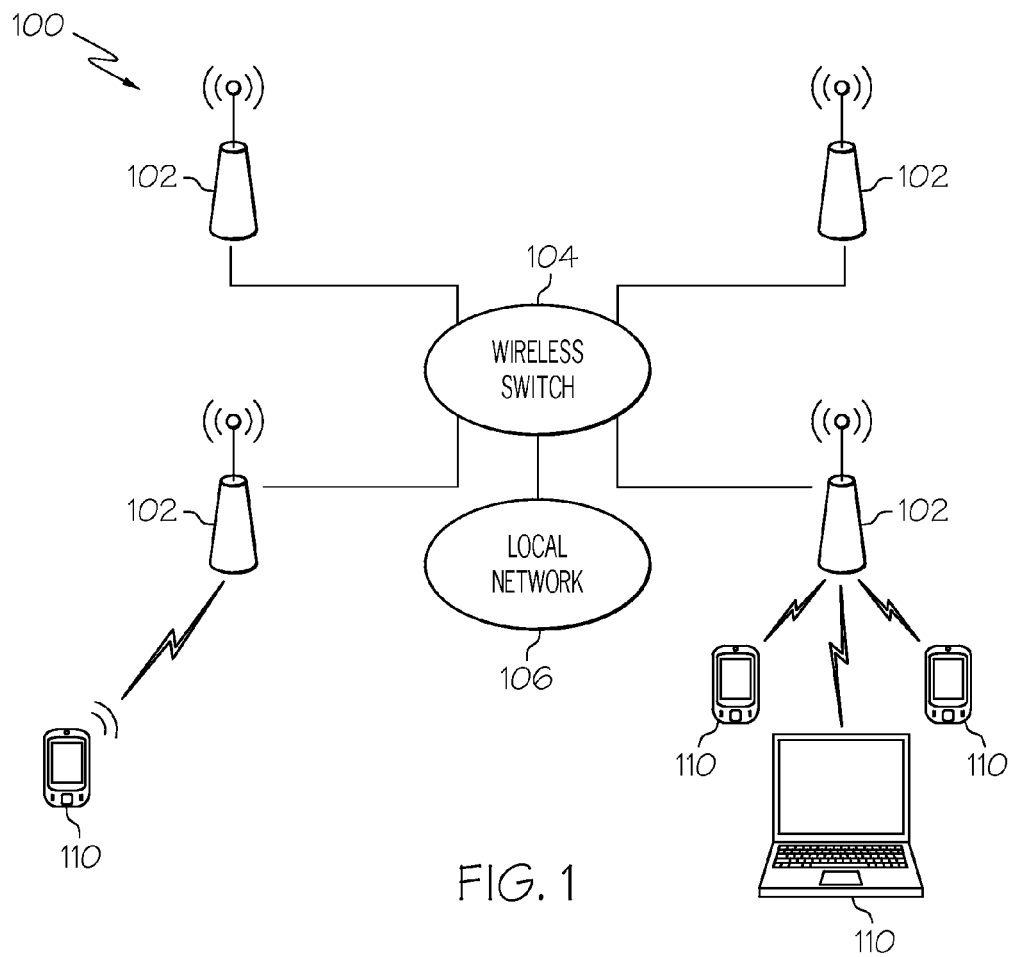
FIG. 1 is a schematic representation of an exemplary wireless network in accordance with one embodiment.

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of network architectures, data transmission protocols, and mobile device configurations, and that the system described herein is merely one suitable example.

For the sake of brevity, conventional techniques related to wireless signal processing, wireless data transmission, WLANs, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. In addition, certain terminology may also be used in the following description for the purpose of reference only, and thus are not intended to be limiting. For example, the terms "first", "second" and other such numerical terms referring to structures do not imply a sequence or order unless clearly indicated by the context.

Technologies and/or concepts described herein related to methods and apparatus for determining the physical location of a wireless mobile device that is in a sleep mode. In an exemplary embodiment, a management or control component (such as a wireless switch) identifies the wireless mobile device to be located and initiates a beacon frame (or signal) from a first wireless access device associated with the mobile device to wake the mobile device from the sleep mode. In one or more embodiments, the wireless switch identifies and configures one or more additional wireless access devices for communicating on the same channel as the first wireless access device. In an exemplary embodiment, the mobile device transmits a frame (or signal) in response to the beacon frame, which is received by one or more wireless access devices. As described in greater detail below, the wireless switch determines the physical location of the mobile device based on the physical location of the one or more wireless access devices and the respective signal strength of the frame transmitted by the mobile device at each location.

Referring now to FIG. 1, in an exemplary embodiment, a wireless network 100 includes, without limitation, a plurality of wireless access devices 102 and a wireless switch 104. In an exemplary embodiment, the wireless network 100 is configured to support communications between and/or among mobile devices 110, and may include additional devices to support the functionality of the wireless network 100, such as Ethernet switches, and the like. The wireless switch 104 may be coupled to a local network 106, which in turn may be coupled to one or more additional components and/or computer networks, as will be understood. In the illustrated embodiment, the wireless access devices 102 are preferably realized as wireless access ports, which rely on the network intelligence and management functions provided by the wireless switch 104, as described in greater detail below. In this regard, the wireless access ports are "thin" or "lightweight" access devices. In alternate embodiments, the wireless access devices 102 can be realized as wireless access points, which are "thick" devices having embedded network intelligence and management functions that take the place of that normally provided by a wireless switch. It should be appreciated that in practice the wireless switch 104 may not be used in some alternate embodiments. In such embodiments that do not include a wireless switch 104, the features and/or functionality described below in the context of the wireless switch 104 may be equivalently incorporated into one or more wireless access devices 102 or another management or control component on the wireless network 100, as will be appreciated in the art.

It should be understood that FIG. 1 is a simplified representation of a wireless network 100 for purposes of explanation. A practical embodiment may have any number of wireless switches 104, each supporting any number of wireless access devices 102, and each wireless access device supporting any number of mobile devices 110. As such, the topology and configuration of the wireless network 100 can vary to suit the needs of the particular application, and FIG. 1 is not intended to limit the application or scope of the subject matter in any way. In an exemplary embodiment, the wireless network 100 is configured as a wireless local area network (WLAN). In alternative embodiments, the wireless network 100 may be configured as a wireless personal area network (WPAN), a wireless wide area network (WWAN), or any other suitable network configuration. The wireless network 100 may be configured to utilize a data communication protocol in accordance with IEEE 802.11, conventional Internet Protocol techniques, TCP/IP, hypertext transfer protocol (HTTP), SOAP, or another comparable protocol.

In a preferred embodiment, the wireless access devices 102 are physically connected to the wireless switch 104 (e.g., via an Ethernet cable). In alternative embodiments, the wireless access devices 102 may be coupled to the wireless switch 104 via one or more additional wireless switches, access devices, Ethernet switches, routers, and/or various combinations thereof In this regard, the wireless access devices 102 are at least logically connected to the wireless switch 104, but need not be physically connected to the wireless switch 104. In an exemplary embodiment, the wireless access devices 102 are configured to receive data from mobile devices 110 over wireless data communication links. Once that data is captured by the wireless access device 102, the data may be encapsulated (e.g., into a packet format compliant with a suitable data communication protocol) for communication to another wireless access device 102, a mobile device 110, and/or the local network 106 in a conventional manner. In some embodiments, the wireless access devices 102 may have more than one antenna, and the wireless access devices 102 may be configured to support multiple-input multiple-output (MIMO) operation, as will be appreciated in the art.

A mobile device 110 may be realized using any suitable platform, including, without limitation: a cellular telephone; a personal digital assistant; a digital media player; a portable video game device; a laptop or other portable computer; or the like. In an exemplary embodiment, a mobile device 110 is configured to scan for wireless access devices 102, select an access device from a list of access devices within range, and send an association request to the selected access device, as will be appreciated in the art. In an exemplary embodiment, once a mobile device 110 has successfully associated with a wireless access device 102, if there is no pending data for the mobile device 110 to transmit and/or receive, the mobile device enters into a sleep mode (or alternatively, a standby mode or power save mode). As used herein, a "sleep mode," "power save mode," "standby mode," and any equivalents thereof should be understood as referring to a state where a mobile device 110 consumes less power by substantially shutting off power to networking components (e.g., a network card) except for a timing circuit. In this regard, the mobile device 110 may periodically (e.g., every second) power networking components and listen for beacon transmissions from its associated wireless access device 102 that identify whether the mobile device 110 has pending data (e.g., buffered packets) at the wireless access device 102 awaiting delivery to the mobile device 110, as will be appreciated in the art and described in greater detail below. It should be appreciated that the functionality of the mobile device 110 will largely be dependent on the user, manufacturer, or vendor responsible for configuring and/or designing the mobile device 110, and the subject matter described herein is not limited to use with a specific mobile device 110.

Figure 2:
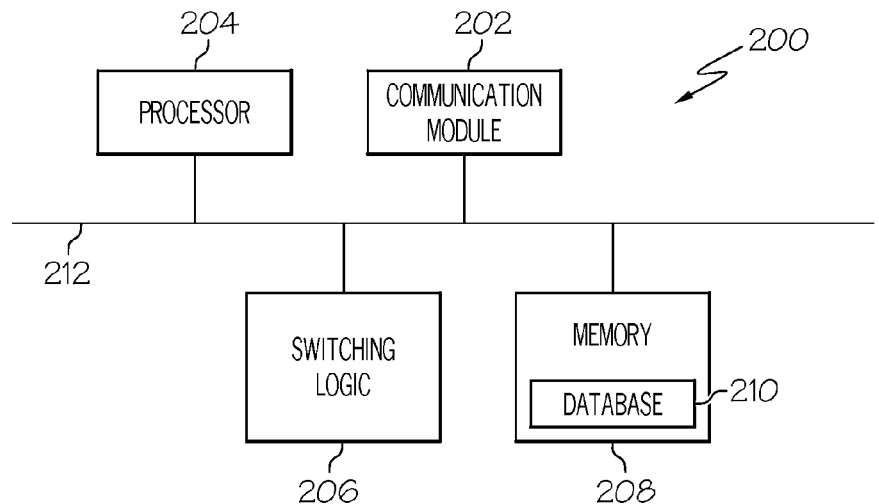
FIG. 2 is a schematic representation of an exemplary wireless switch suitable for use in the wireless network shown in FIG. 1 in accordance with one embodiment.

FIG. 2 is a schematic representation of an embodiment of a wireless switch 200 suitable for use in a network, such as wireless network 100 shown in FIG. 1. In an exemplary embodiment, a wireless switch 200 may include, without limitation: a communication module 202, a processor 204, switching logic 206, and a suitable amount of memory 208. The elements of wireless switch 200 may be interconnected together using a bus 212 or another suitable interconnection arrangement that facilitates communication between the various elements of wireless switch 200. It should be appreciated that FIG. 2 depicts the wireless switch 200 in an oversimplified manner, and a practical embodiment may include additional components and suitably configured processing logic to support known or conventional operating features that are not described in detail herein.

In an exemplary embodiment, wireless switch 200 contains intelligence and processing logic that facilitates centralized control and management of WLAN elements, including wireless access devices associated with wireless switch 200. In an exemplary embodiment, one wireless switch 200 can support or adopt any number of wireless access devices up until an adoption limit, which may be determined by hardware limitations (e.g., a number of physical ports or limitations of processor 204) or software limitations (e.g., the wireless switch 200 is only licensed for use with a limited number of access devices or otherwise only supports a limited number of access devices), as will be appreciated in the art. Thus, wireless switch 200 is capable of serving multiple wireless access devices, which in turn can serve multiple mobile devices. Wireless switch 200 is suitably configured to transmit and receive data, and it may serve as a point of interconnection between a WLAN and a fixed wire (e.g., Ethernet) network.

In an exemplary embodiment, communication module 202 generally represents the hardware, software, firmware, processing logic, and/or other components of wireless switch 200 that enable bidirectional communication between wireless switch 200 and network components to which wireless switch 200 is coupled. For example, referring to FIG. 1, communication module 202 is suitably configured to communicate with components on the wireless network 100, such as the wireless access devices 102 and/or the local network 106. In accordance with one embodiment, communication module 202 provides an Ethernet interface such that wireless switch 200 can communicate with a conventional Ethernet-based computer network. In this regard, communication module 202 may include a physical interface for connection to the computer network, and communication module 202 (and/or processor 204) may handle Ethernet addressing for data packets sent from wireless switch 200.

In an exemplary embodiment, the communication module 202 may support one or more wireless data communication protocols that are also supported by the wireless network infrastructure. In an exemplary embodiment, communication module 202 is preferably compliant with at least the IEEE 802.11 specification. However, in practical embodiments, any number of suitable wireless data communication protocols, techniques, or methodologies may be supported by communication module 202, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

In an exemplary embodiment, the processor 204 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this regard, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor 204 includes processing logic that may be configured to carry out the functions, techniques, and processing tasks associated with the operation of the wireless switch 200, as described in greater detail below. Furthermore, the steps of a method or algorithm described in connection with the embodiments disclosed herein may be embodied directly in hardware, in firmware, in a software module executed by processor 204, or in any practical combination thereof.

In an exemplary embodiment, switching logic 206, which may be partially or completely realized in the processor 204, represents processing logic and functionality associated with the data switching and communicating features of wireless switch 200. Switching logic 206 may be configured to perform conventional operations that enable data traffic in the wireless network to be communicated between mobile devices, access devices, network infrastructure components, and network-based systems or applications.

In an exemplary embodiment, memory 208 includes sufficient data storage capacity to support the operation of wireless switch 200. Memory 208 may be realized as RAM memory, flash memory, registers, a hard disk, a removable disk, or any other form of storage medium known in the art. In this regard, memory 208 can be coupled to processor 204 such that processor 204 can read information from, and write information to, memory 208. In the alternative, memory 208 may be integral to processor 204. In accordance with one embodiment, one or more software modules may reside in memory 208. Memory 208 is utilized to store information associated with various wireless access devices or mobile devices supported by and/or associated with the wireless switch 200. In an exemplary embodiment, memory 208 implements and/or includes a database 210 configured to maintain physical location information for each wireless access device of the plurality of wireless access devices supported by and/or associated with wireless switch 200, as described in greater detail below.

Figure 3:
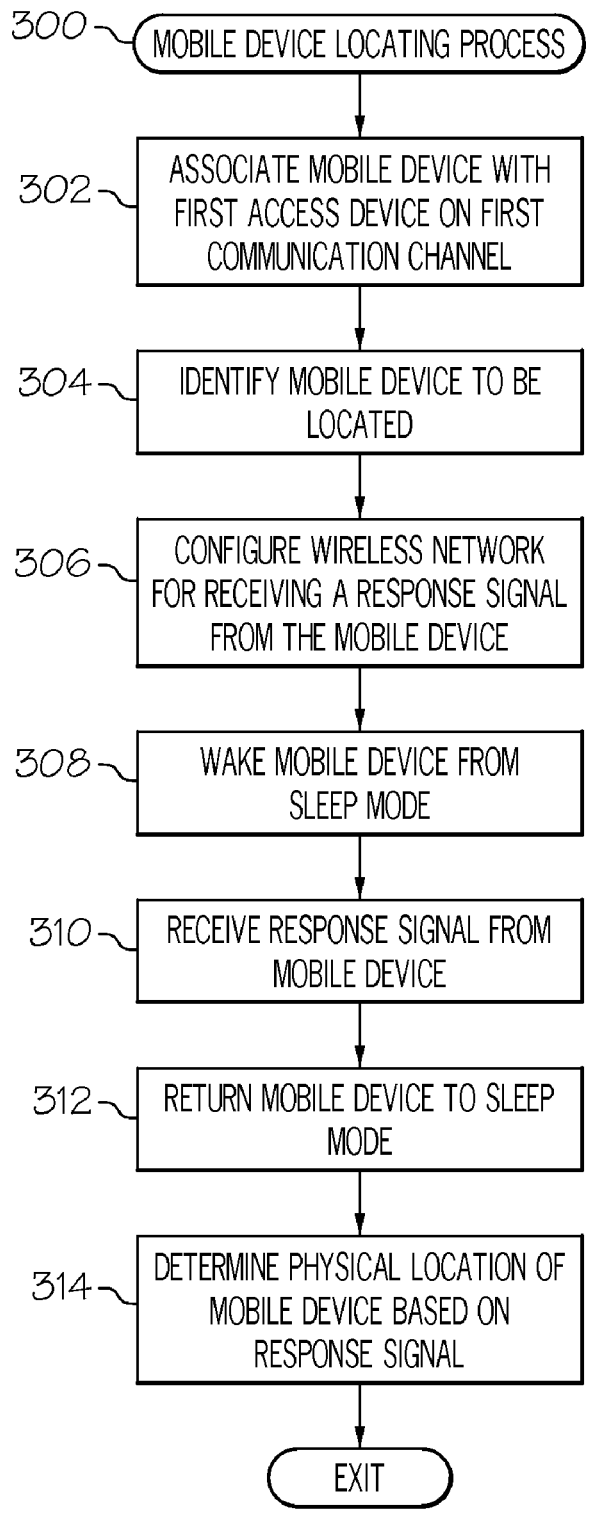
FIG. 3 is a flow diagram of a mobile device locating process in accordance with one embodiment.

Referring now to FIG. 3, in an exemplary embodiment, a wireless network may be configured to perform a mobile device locating process 300 and additional tasks, functions, and/or operations as described below. The various tasks may be performed by software, hardware, firmware, or any combination thereof. For illustrative purposes, the following description may refer to elements mentioned above in connection with FIG. 1 and FIG. 2. In practice, the tasks, functions, and operations may be performed by different elements of the described system, such as the wireless switch 104, 200, the processor 204, the memory 208, the database 210, the wireless access devices 102, and/or the mobile devices 110. It should be appreciated any number of additional or alternative tasks may be included, and may be incorporated into a more comprehensive procedure or process having additional functionality not described in detail herein. Furthermore, although the mobile device locating process 300 may be described in the context of a wireless switch based implementation, it should be understood that in alternative embodiments, the mobile device locating process 300 may be implemented using wireless access points without the use of a wireless switch.

Referring now to FIG. 3, and with continued reference to FIG. 1 and FIG. 2, the mobile device locating process 300 may be performed to determine a physical location of a mobile device. In an exemplary embodiment, the mobile device locating process 300 is utilized to determine the physical location of a mobile device that has associated with a wireless access device and entered into a sleep mode (or power save mode). In this regard, the mobile device locating process 300 may initialize by associating a mobile device with a first wireless access device on a first communication channel (task 302). For example, referring to FIG. 4, with continued reference to FIGS. 1-3, a mobile device 410 may connect to the wireless network 400 by associating with a first wireless access device 402 supported by a wireless switch 404 in a conventional manner. In this regard, the wireless switch 404 may implement a table (or list, cache, database or another suitable data structure) that maintains associations of mobile devices and wireless access devices for those wireless access devices 402, 406, 408 supported by the wireless switch 404. In an exemplary embodiment, the wireless network 400 is configured to support a plurality of communication channels, that is, each wireless access device 402, 406, 408 supported by the wireless switch 404 may be suitably configured to support communications by utilizing a different center frequency than the other wireless access devices 402, 406, 408, as will be appreciated in the art. In this regard, the mobile device 410 is associated with the first access device 402 on a first communication channel. In an exemplary embodiment, once the mobile device 410 associates with the first access device 402 and no longer has any pending data for transmission and/or receipt, the mobile device 410 notifies the wireless switch 404 and/or first access device 402 that it intends to enter into a sleep mode (or standby mode or power save mode) before entering the sleep mode. Once in sleep mode, the components of the mobile device 410 consume less power (e.g., radio components are disabled or placed into a low power state) relative to an active mode in which the mobile device 410 is actively transmitting and/or receiving data, as will be appreciated in the art.

Figure 4:
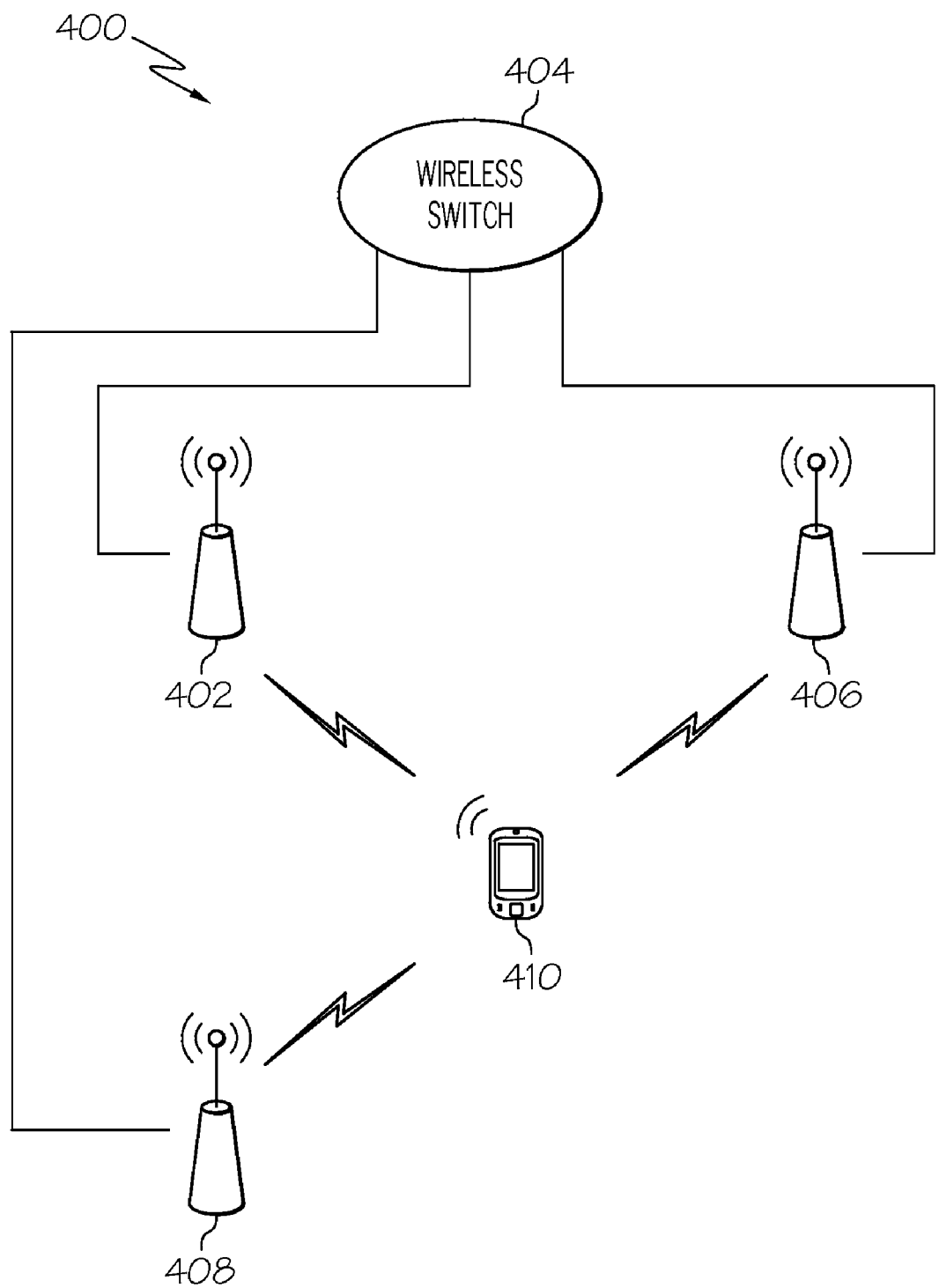
FIG. 4 is a schematic representation of an exemplary wireless network suitable for use in the mobile device locating process of FIG. 3 in accordance with one embodiment.

Referring again to FIG. 3, with continued reference to FIG. 1, FIG. 2, and FIG. 4, in accordance with one embodiment, the mobile device locating process 300 initializes by identifying a mobile device to be located (task 304). For example, the mobile device locating process 300 may identify a mobile device in response to a user (e.g., a system administrator or network administrator) indicating a desire to locate a particular mobile device (e.g., mobile device 410), or an automated program and/or process requesting and/or otherwise indicating a desire for the physical location of the particular mobile device. In this regard, the wireless switch 404 and/or processor 204 may identify the mobile device 410 to be located on the wireless network 400, and the wireless switch 404 and/or processor 204 may determine and/or identify the wireless access device 402 that is associated with the mobile device 410 in order to perform additional tasks and functions as described below.

In an exemplary embodiment, the mobile device locating process 300 continues by configuring the wireless network for receiving a response signal from the identified mobile device (task 306). In accordance with one embodiment, if the mobile device locating process 300 is configured for only one wireless access device, the mobile device locating process 300 and/or wireless switch 404 may configure the first wireless access device 402 for receiving a response signal from the mobile device 410, as described in greater detail below.

In another embodiment, the mobile device locating process 300 may identifies and configure one or more wireless access devices for receiving the response signal from the identified mobile device on the first communication channel. In this regard, the mobile device locating process 300 identifies and/or determines one or more wireless access devices for communication on the first communication channel based on one or more selection criteria. For example, the mobile device locating process 300 may identify and/or determine a second wireless access device for communication on the first communication channel based on the distance from (or proximity to) the first wireless access device 402. In another embodiment, the mobile device locating process 300 may identify and/or determine the second wireless access device based on the type of data and/or content the wireless access device is transmitting and/or receiving, as described in greater detail below.

It should be understood that the mobile device locating process 300 may identify any number of wireless access devices for communication on the first communication channel. In accordance with one embodiment, the mobile device locating process 300 identifies a plurality of wireless access devices for communication on the first communication channel by determining the two neighboring wireless access devices to the first wireless access device. For example, after determining and/or identifying the wireless access device 402 associated with the identified mobile device 410, the wireless switch 404 may determine and/or identify the two neighboring wireless access devices 406, 408 based on physical location information of the wireless access devices 406, 408. In this regard, the wireless switch 404 may maintain (e.g., in memory 208 and/or database 210) physical location information for supported wireless access devices 402, 406, 408. Depending on the embodiment, the physical location information maintained by the wireless switch 404 may be predetermined and/or preprogrammed, or alternatively, the physical location information may be dynamically determined and/or assigned (e.g., a wireless mesh network).

In other embodiments, depending on the selection criterion, the identified wireless access device(s) may not neighbor the first wireless access device. For example, the mobile device locating process 300 may identify and/or determine a second wireless access device for communication on the first communication channel based on the type of data and/or content the wireless access device is transmitting and/or receiving. For example, the mobile device locating process 300 and/or wireless switch 404 may be configured identify the neighboring wireless access device based on whether the wireless access device is supporting voice data or some other type of data/content that should not be interrupted. If the mobile device locating process 300 and/or wireless switch 404 determines that a nearest wireless access device to the first wireless access device 402 is communicating and/or supporting voice data, the mobile device locating process 300 and/or wireless switch 404 may then identify and/or determine the next nearest wireless access device to the first wireless access device 402 for communication on the first communication channel, depending on the type of data and/or content the next nearest wireless access device is transmitting and/or receiving.

In an exemplary embodiment, the mobile device locating process 300 configures the identified wireless access device(s) for communication on the first communication channel. For example, if the mobile device locating process 300 identifies the second wireless access device 406 for communication on the first communication channel (e.g., based on the second wireless access device 406 neighboring the first wireless access device 402), the mobile device locating process 300 continues by configuring the second wireless access device 406 for communicating and/or receiving data on the first communication channel. For example, the mobile device locating process 300 and/or wireless switch 404 may configure the second wireless access device 406 by instructing and/or initiating transmission of a clear to send (CTS) message (or an equivalent thereof) from the second wireless access device 406. In this manner, any mobile devices that may be associated with the second wireless access device 406 (e.g. on a second communication channel) will temporarily cease transmitting data to the second wireless access device 406, as will be appreciated in the art. The mobile device locating process 300 and/or wireless switch 404 may then instruct and/or otherwise configure the second wireless access device 406 such that the transceiver and/or antenna in the second wireless access device 406 is configured to receive data and/or signals on the first communication channel. Similarly, the mobile device locating process 300 and/or wireless switch 404 may identify a third wireless access device 408 and configure the third wireless access device 408 for communication on the first communication channel. In this regard, the response signal (or frame) may be received by each wireless access device configured for communication on the first communication channel, as described below.

In an exemplary embodiment, the mobile device locating process 300 continues by waking up the mobile device from the sleep mode (task 308). That is, the mobile device locating process 300 causes the mobile device to temporarily exit the sleep mode and transmit a frame or signal to the wireless network in response to exiting the sleep mode, as described in greater detail below. In an exemplary embodiment, the mobile device locating process 300 wakes the mobile device 410 by transmitting, from the first wireless access device 402, a beacon signal (or a beacon frame) configured to wake up or initiate a response signal (or response frame) from the mobile device 410. In accordance with one embodiment, the mobile device locating process 300 wakes the mobile device 410 by indicating pending data for the mobile device 410 at the first wireless access device 402, even though there may be no actual data for the mobile device 410 to receive (e.g., a "dummy" or "fake" data indication). For example, the first wireless access device 402 may transmit a beacon signal (or beacon frame) that is configured such that the traffic information map (TIM) indicates pending data for the mobile device 410. That is, the TIM bit corresponding to the mobile device 410 may be changed from a '0' to '1' to indicate pending data for the mobile device 410. In this regard, the wireless switch 404 and/or processor 204 may instruct and/or otherwise initiate transmission of a beacon signal (or beacon frame) from the first wireless access device 402 in order to wake the mobile device 410 from the sleep mode. As described in greater detail below, the mobile device 410 interprets the beacon signal as meaning that there is pending data at the wireless access device 402 that is awaiting delivery to the mobile device 410, and thus the beacon signal causes the mobile device 410 to at least temporarily exit the sleep mode.

In an exemplary embodiment, a mobile device in a sleep mode (or standby mode or power save mode) is configured to passively listen for a beacon signal (or beacon frame) at regular intervals, as will be appreciated in the art. That is, at a predetermined interval, the mobile device may activate its wireless module or radio for a period of time long enough to receive and/or process a beacon signal. For example, every second, the mobile device may be configured to listen (or wake up) for a few milliseconds before returning to sleep mode. In other words, the mobile device briefly powers up and/or powers on components for a period of time before shutting power back off. If the beacon signal (or beacon frame) indicates that the mobile device has pending and/or buffered data at an associated access device (e.g., the TIM bit for the mobile device is set to '1'), the mobile device exits the sleep mode (or wakes up) and transmits a response signal (or frame or packet) to the wireless network and/or associated wireless access device. That is, the mobile device transmits a response signal (or frame) to the wireless network and/or associated wireless access device in response to receiving the beacon signal or beacon frame. For example, depending on the embodiment, the mobile device may respond by transmitting a NULL data frame, a power save poll (or PS-Poll) frame, or another suitable response frame indicating the mobile device is awake or active and awaiting data from the wireless network and/or associated wireless access device.

In an exemplary embodiment, the mobile device locating process 300 continues by receiving the response signal from the mobile device on the first communication channel (task 310). In accordance with one embodiment, the associated access device 402 has a plurality of antennas configured to receive data on the first communication channel. In this regard, a first antenna of the associated access device 402 may receive the response signal (or frame) at a first time having a first signal strength and a second antenna of the associated access device 402 may receive the response signal at a second time having a second signal strength. In an exemplary embodiment, the associated wireless access devices 402 is configured to record an identifier for the mobile device (e.g., the source media access control (MAC) address of the mobile device), the signal strength of the received signals at each antenna (e.g., the received signal strength indication or RSSI), and the time at which each antenna receives the response signal (or alternatively, the time difference), and provides and/or routes this information to the wireless switch 404 for determining the physical location of the mobile device, as described below.

In another embodiment, the mobile device locating process 300 receives the response signal (or frame) from the mobile device on the first communication channel at each wireless access device configured for communication on the first communication channel, as described above. In an exemplary embodiment, the response signal from the mobile device is received on the first communication channel at the first wireless access device 402 along with the configured wireless access device(s). Each wireless access device configured for the first communication channel receives the response signal (or frame) as having a signal strength based on the physical location of the respective wireless access device relative to the physical location of the mobile device, as will be appreciated in the art. For example, referring again to FIG. 4, the first wireless access device 402 receives the response signal (or frame) having a first signal strength, the second wireless access device 406 receives the response signal (or frame) having a second signal strength, and the third wireless access device 408 receives the response signal (or frame) having a third signal strength. In a similar manner, each wireless access device may receive the response signal (or frame) at a different time based on the physical location of the respective wireless access device relative to the physical location of the mobile device, as will be appreciated in the art. In an exemplary embodiment, the wireless access devices 402, 406, 408 record an identifier for the mobile device (e.g., the source media access control (MAC) address of the mobile device 410) along with the signal strength of the received signal (e.g., the received signal strength indication or RSSI) and/or the time the received signal was received, and provide and/or route the identifier, the received signal strength, and timing information to the wireless switch 404 for determining the physical location of the mobile device 410, as described below.

In response to receiving the signal strength information from the identified wireless access devices, in an exemplary embodiment, the mobile device locating process 300 reconfigures the identified wireless access devices for communication on their previously and/or initially assigned communication channels. For example, referring to FIG. 4, the wireless switch 404 may configure the second wireless access device 406 for communication on a second communication channel and the third wireless access device 408 for communication on a third communication channel in a conventional manner.

In an exemplary embodiment, the mobile device locating process 300 returns the mobile device to the sleep mode (task 312). For example, if the first wireless access device 402 does not transmit any data to the mobile device 410 (e.g., because there was no pending data), the mobile device 410 may automatically return to the sleep mode. In accordance with one embodiment, the mobile device locating process 300 responds to the mobile device in a manner that indicates the mobile device may return to the sleep mode. For example, the wireless access device associated with the mobile device may transmit a beacon signal (or beacon frame) that indicates there is no pending data for the mobile device. As described above, the TIM bit corresponding to the mobile device may be changed from '1' back to '0' to indicate there is no pending data for the mobile device. In response to receiving this beacon signal, the mobile device may determine that there is no data awaiting delivery to mobile device and the mobile device may reenter the sleep mode.

In an exemplary embodiment, the mobile device locating process 300 continues by determining the physical location of the mobile device based on one or more characteristics of the received response signals (task 314). In accordance with one embodiment, if the mobile device locating process 300 is configured for only one wireless access device, the mobile device locating process 300 may determine the physical location of the mobile device using techniques such as uplink time difference of arrival (U-TDOA) in a conventional manner. For example, as described above, if a first antenna of the associated access device 402 receives the response signal (or frame) at a first time and a second antenna of the associated access device 402 receives the response signal at a second time, the mobile device locating process 300 may determine the physical location of the mobile device 410 based on the difference between the first time and the second time and the physical distance between the antennas, as will be appreciated in the art. Similarly, the mobile device locating process 300 may be configured to implement time difference of arrival techniques using multiple wireless access devices, as will be appreciated in the art.

In another embodiment, the mobile device locating process 300 may determine the physical location of the mobile device the respective signal strength of the received response signal (or frames) and the physical location where each respective signal strength was received and/or observed. For example, referring again to FIG. 4, the wireless switch 404 may determine the physical location of the mobile device 410 based on the first signal strength (e.g., at first wireless access device 402), the physical location of the first wireless access device 402, the second signal strength (e.g., at second wireless access device 406), the physical location of the second wireless access device 406, the third signal strength (e.g., at third wireless access device 408), and the physical location of the third wireless access device 408. In this regard, the mobile device locating process 300 may determine the physical location of the mobile device by performing triangulation based on the first signal strength, the second signal strength, the third signal strength, and the physical locations of the wireless access devices 402, 406, 408, as will be appreciated in the art. In another embodiment, the determines the physical location of the mobile device by performing trilateration based on the respective signal strengths and the physical locations of the wireless access devices 402, 406, 408, as will be appreciated in the art. A number of suitable methods for determining the physical location of the mobile device may be utilized, such as multilateration or other techniques, depending on the number of identified wireless access devices and the needs of a particular wireless network.

It should be appreciated that the subject matter is not intended to be limited to a particular manner for calculating and/or determining the physical location of the mobile device. For example, in accordance with one embodiment, if the mobile device is equipped with a positioning system, such as a global positioning system, the response signal from the mobile device may include also information related to the location and/or positioning mobile device obtained by the positioning system. In such an embodiment, the wireless access device associated with the mobile device may receive the response signal containing location and/or positioning information, and the mobile device locating process 300 may determine the physical location of the mobile device based on the location and/or positioning information from the global positioning system.

It should be appreciated that the subject matter described herein allows a mobile device in a sleep mode (or power save or standby mode) to be located without modifying the functionality of the mobile device. The mobile device receives and responds to beacon signals (or frames) in a conventional manner, and may enter and exit sleep mode without impacting the mobile device locating process. Furthermore, additional wireless access devices can be configured to receive and measure the response signals sent from the mobile device with minimal impact on the data and/or content being transmitted by the other wireless access devices.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for locating a mobile device in an IEEE 802.11 wireless local area network (WLAN), the mobile device being initially in a sleep mode, the mobile device being associated with a first WLAN access device on a first WLAN channel, the method comprising:

configuring at least one other WLAN access device operable on other respective WLAN channels for receiving data on the first WLAN channel by having the at least one other WLAN access device send a Clear To Send message to mobile devices being served by that at least one other WLAN access device on the other respective WLAN channels and switching the at least one other WLAN access device to operate on the first WLAN channel;

waking the mobile device from the sleep mode by transmitting a beacon that falsely indicates that there is pending data for the mobile device, wherein the mobile device transmits a beacon response frame on the first WLAN channel in response to waking;

receiving the beacon response frame by the first and at least one other WLAN access devices; and determining a location of the mobile device based on at least one respective characteristic for the beacon response frame received at the first and at least one other WLAN access devices, wherein falsely indicating pending data comprises transmitting a beacon frame from the first wireless access device, the beacon frame including a traffic information map, wherein the traffic information map associated with the mobile device is configured to falsely notify the mobile device of data awaiting delivery to the mobile device.

2. The method of claim 1, further comprising an initial step of identifying a particular mobile device to be located to a WLAN switch, whereupon the WLAN switch will determine the first WLAN access device and first WLAN channel associated with that mobile device.

3. The method of claim 1, further comprising returning the mobile device to the sleep mode after the mobile device transmits the frame.

4. The method of claim 1, wherein the at least one other WLAN access device is an access device neighboring the first WLAN access device unless the at least one WLAN access device is supporting a type of communication that should not be interrupted.

5. The method of claim 1, wherein the at least one respective characteristic is an identifier of the mobile device and at least one of a respective signal strength of the received frame at each access device and a respective time of arrival of the received frame at each access device.

6. A wireless switch for an IEEE 802.11 wireless local area network (WLAN) having a plurality of wireless access devices, wherein a mobile device is associated with a first WLAN access device of the plurality of wireless access devices on a first WLAN channel, the wireless switch comprising:
- a communication module, the communication module being configured to communicate with the plurality of wireless access devices;
- a database, the database being configured to maintain physical location information for each wireless access device of the plurality of wireless access devices; and
- a processor coupled to the communication module and the database, wherein the processor is configured to:
  - configure at least one other WLAN access device other than the first WLAN access device operable on other respective WLAN channels other than the first WLAN channel for receiving data on the first WLAN channel by having the at least one other WLAN access device send a Clear To Send message to mobile devices being served by that at least one other WLAN access device on the other respective WLAN channels and switching the at least one other WLAN access device to operate on the first WLAN channel;
  - wake the mobile device from the sleep mode by initiating the transmission of a beacon that falsely indicates that there is pending data for the mobile device, wherein the mobile device transmits a beacon response frame on the first WLAN channel in response to waking to be received by the first and at least one other WLAN access devices; and
  - determine a physical location of the mobile device based at least in part on a physical location of the first wireless access device, a physical location of the second wireless access device, and at least one respective characteristic for the beacon response frame received at the first and at least one other WLAN access devices,
- wherein falsely indicating pending data comprises transmitting a beacon frame from the first wireless access device, the beacon frame including a traffic information map, wherein the traffic information map associated with the mobile device is configured to falsely notify the mobile device of data awaiting delivery to the mobile device.

* * * * *